Patented Oct. 19, 1943

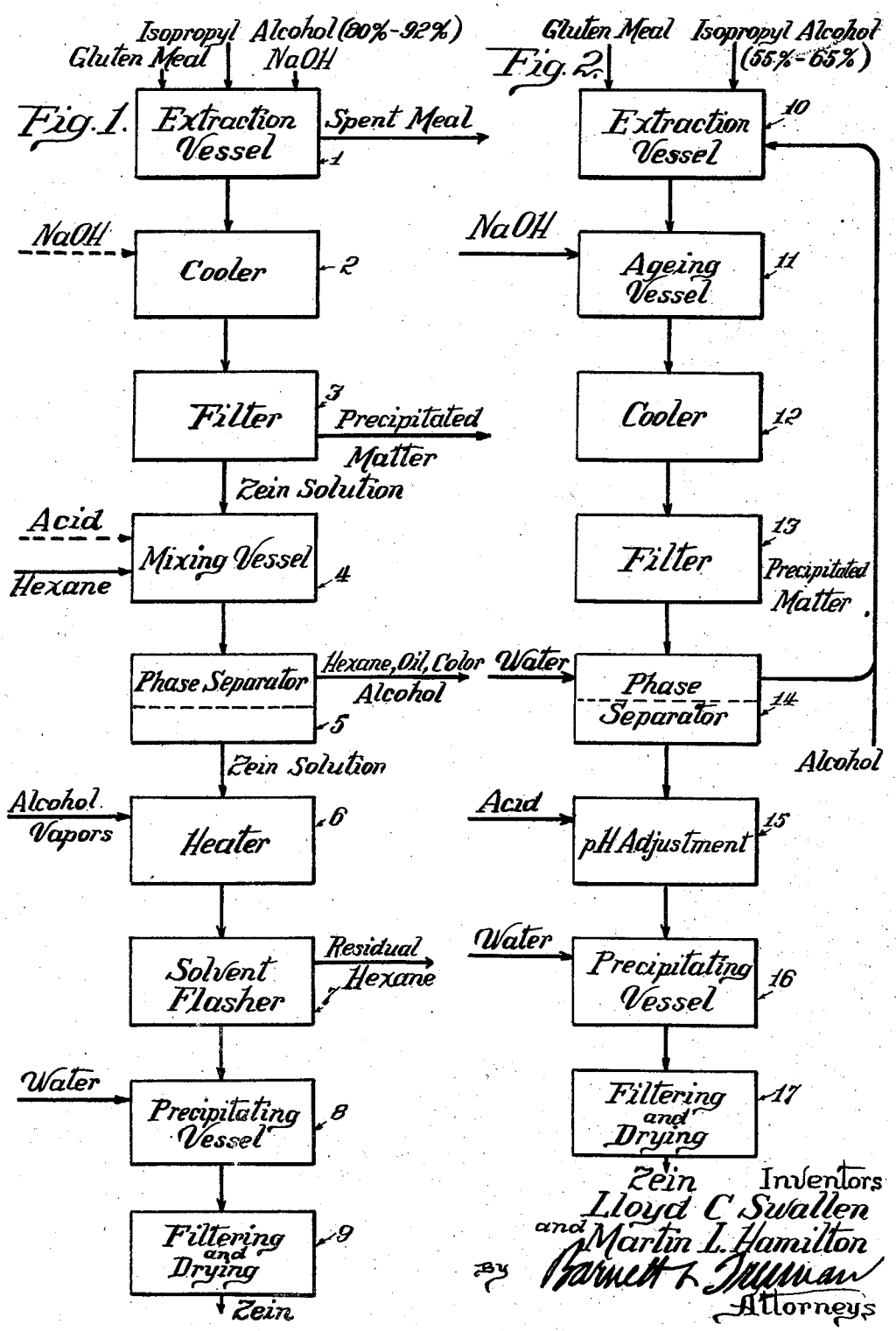

2,332,356

UNITED STATES PATENT OFFICE 2,332,356

PRODUCTION OF ZEIN

Lloyd C. Swallen, Villa Park, and Martin L. Hamilton, Berwyn, Ill., assignors to Corn Products Refining Company, New York, N. Y., a corporation of New Jersey Application August 3, 1940, Serial No. 350,532

11 Claims. (Cl. 260—123)

This invention relates to the production or treatment of zein, the alcohol soluble constituent of corn (maize), gluten, for the purpose of improving the quality of the zein in two respects particularly: improved solubility characteristics and increased solution stability. Improved solubility is evidenced by reduction in insoluble protein and lower cloud point.

For purposes of comparison the solubility of the zein, as discussed herein, will be measured, negatively, by determination of the amount of insoluble proteins, precipitated when 1 gram of zein is dissolved in 100 cc. of 92%, by volume, ethyl alcohol at 25° C.

The cloud point of the zein, which is also a measure of solubility, is determined by dissolving 1 gram of zein in 5 cc. of 95% by volume ethyl alcohol, cooling the solution until definitely turbid, then allowing the solution to warm while stirring with a thermometer until the solution becomes homogeneous. The temperature thus obtained is corrected to a final alcohol concentration in a solvent of 93%, by volume, by means of appropriate correction factors which take into consideration the moisture content of the zein. The temperature at which the solution becomes homogeneous from a condition of turbidity, or vice versa from being clear begins to become turbid is called the cloud point.

The solution stability tests are made as follows: zein equivalent to 9 grams of protein is dissolved in 25 cc. of 95%, by volume, ethyl alcohol. Sufficient water is added to reduce the alcohol concentration, taking into consideration the water content of the zein, to 91%, by volume. The resulting solution is placed in two test tubes approximately 14 mm. in diameter and 12 cm. long. The tubes are filled to such a height that a bubble about 1 cm. long remains. One of the tubes is stored at 25° C. and another at 50° C. At appropriate intervals the viscosities are determined at 25° C. (the 50° sample being cooled to 25° for this test) by inverting the test tubes and noting the time in seconds required for the air bubble to make its way through the zein. The end points in these tests, reported as days for example, are when the viscosity attained in the 50° test is 15 seconds and in the 25° test is 20 seconds.

These tests are purely arbitrary and other tests giving, in comparison, equivalent results, might be employed for determining the solubility of the zein, as produced or treated in accordance with the present invention, and the stability of its solution.

The improvements in the quality of the zein in accordance with the present invention are effected by introducing into a solution of the zein, for example, into the extract from the gluten meal at any stage of the process or into the gluten meal undergoing extraction, an alkaline substance.

The alkaline substances which may be used in this connection include sodium, potassium, ammonium and calcium hydroxides, sodium and potassium carbonates, and other alkaline materials of similar nature. The use of barium hydroxide is possible but is less effective because it combines with the zein to form salts which, or some of which, are less soluble than the untreated zein. All alkaline substances may be used more or less effectively.

The solutions treated in accordance with the present invention may be solutions in which the zein is dissolved in any of the common zein solvents in which the solvent is not chemically reactive with the zein or alkali; those, for example, as are ordinarily used in the extraction of the zein from gluten meal, such as ethyl alcohol or isoproply alcohol.

The invention is applicable, when used in connection with the extraction of the zein from its raw material, to either a strong alcoholic extraction, employing, say, 80% to 92% isopropyl alcohol (or 85% to 95% ethyl alcohol); or to an extraction process using more dilute alcohol such as 55%—65% isopropyl alcohol (or 55%—70% ethyl alcohol). These two types of extraction process do not produce zein having exactly the same characteristics. The process using dilute alcohol extracts fractions not removed when a more concentrated alcohol is used and gives a zein of less solubility, when dissolved in more concentrated alcohol, and of reduced stability in comparison with the product of the stronger alcohol extraction. There is, therefore, a distinct advantage in using the expedient of the present invention in connection with an extraction process employing a weak alcohol. By treatment of the zein, thus obtained, with an alkali the relatively poor quality zein obtained by the weak alcohol may be improved so as to compare favorably with the zein extracted by strong alcohol. There is a more or less critical distinction between the two processes: the processes using strong alcohol require an oil and color removing operation which is not necessary with the processes using weak alcohols. The latter processes are, therefore, cheaper but give a poorer quality of zein which, however, can be improved in accordance with the present invention.

It is preferable to introduce the alkaline substance into the extraction step rather than at a later stage of the process because the relatively high temperatures in this stage of the process promote the desired reaction between the alkaline substance and the zein. However, the alkaline substance may be added at a later stage of the process, but in such case the introduction should be, preferably at least, in advance of a filtering step in order that substances or compounds precipitated by the alkali treatment should be removed from the solution. It is also preferable in case the alkali is introduced into the extract after the extracting operation to subject the zein solution to an ageing operation in the presence of the alkali to compensate for the high temperatures prevailing in the extracting step.

Where the improvement of the present invention is used in connection with a process of extraction involving ultimate precipitation of the zein from an alcoholic solution by the addition of large volumes of water, it may be desirable to add enough acid to the zein solution, after filtration, to prevent the formation of emulsions in the precipitating vessel. Approximately one-half of the alkali may be neutralized in this manner without nullifying, to any substantial extent, the beneficial results of the alkali treatment in the respects above noted.

Where the alkali is added to the extraction step, the quantity is preferably such as to give the extract a pH of 9 to 11.5, or slightly higher than this. The amount of alkali added at this stage of the process, in order to get the same results, should be greater than the amount added at later stages of the process since the non-zein constituents of the gluten meal take up a certain amount of alkali. Hence, there are advantages in treating the extract with the alkali instead of the material being extracted. The combined improvement in solubility and stability of the solution is not obtained in a practical degree by the use of alkali in lesser amounts than are required to give the extract or other solution a pH of 9 or higher. On the other hand, if the pH is substantially higher than 11.5, no additional benefits result and there is danger of degrading the zein chemically.

Where the zein is separated from the alcohol by precipitation in water, the amount of alkali used should not, ordinarily, be great enough to give a pH to the precipitating water solution higher than 10; or the pH should be reduced at this point to 10, or below, by the neutralization of some of the alkali by means of an acid, as referred to above.

The effect of the alkali, particularly in the solutions or extracts of higher alcohol concentration, appears to be to bring a precipitation of protein bodies which are relatively insoluble in the higher alcohol concentrations, and these bodies are consequently removed by filtration. The second effect is to increase the solubility of certain protein fractions in a dilute aqueous alcohol of the concentrations which prevail in the usual precipitating operations or such as prevail when a controlled amount of water is added to precipitate the larger portion of the zein in an essentially fluid state. The latter form of precipitation is largely used in the low alcohol extractions. The alkali by increasing the solubility of these fractions in the aqueous medium prevents their precipitation. The third effect seems to be a permanent solubilizing of the zein.

In the accompanying drawing:

Fig. 1 is a flow sheet illustrating the application of the present invention to a known process of extracting zein with a high concentration of alcohol, in which process the alkali, used in accordance with the present invention, is introduced at the extraction step.

Fig. 2 is a flow sheet illustrating a process using alcohol of low concentration in which process the alkali is added to the extract during or after cooling, and the solution aged, and subsequently filtered.

The flow sheets will be referred to in connection with the following specific examples of the application of the invention to practice. It will be understood that these examples are to be considered as informative and typical merely and not as limiting the invention to the particular operating data given; the intention being to cover all equivalents and also all modifications within the scope of the hereto appended claims. The figures in parentheses indicate practical ranges.

*Example 1—Fig. 1.*—400 grams of gluten meal, 1300 cc. of 85% isopropyl alcohol (80% to 92%) and 7.7 grams (6 to 14 grams) of sodium hydroxide are agitated in the extraction vessel 1 at 60° C. (50°–65° C.) for 1½ hours. The pH of the extract from the extraction vessel is about 10 (9 to 11.5). The extract is cooled at 2 to 15° C. and filtered at 3. The filtered solution is run into a mixing vessel 4 into which is introduced an equal volume of hexane, or other solvent of oil and coloring matter; and the hexane, oil and color, with some alcohol, are separated from the heavy alcohol-zein solution at 5. The hexane with its contents is sent to the recovery system which forms no part of the present invention. The heavy zein-alcohol solution is heated at 6 with the introduction of alcohol vapors and the residual hexane removed in the solvent flasher 7. The zein is separated from the alcohol in the precipitation vessel 8, by the addition to the solution of large amounts of water, and the zein is filtered and dried at 9.

The above process steps, except for the introduction of the alkali, are disclosed in applications for United States patents to Anthony C. Horesi et al., Serial No. 214,512, filed June 18, 1938, (Patent No. 2,238,591, April 15, 1941) and of Lloyd C. Swallen, Serial No. 240,307, filed November 14, 1938, (Patent No. 2,287,649, June 23, 1942) Serial No. 155,691, filed July 26, 1937, (Patent No. 2,221,560, November 12, 1940) and Serial No. 313,671, filed January 13, 1940 (Patent No. 2,221,561, November 12, 1940). These applications for patent describe processes which are now in use.

A product made in accordance with this invention, as just described, employing the preferred operating data given above, contained 1.94% of insoluble protein; had a cloud point of 5.5° C., a stability of 72 days at 25° C., and a stability of 23 days at 50° C. A correspondingly made product, without the use of the alkali, had an insoluble protein content of 4.38% a cloud point of 23° C., a stability at 25° C. at 22 days, and a stability at 50° C. at 13 days. This gives an indication of the improvements in the quality of the zein brought about by the use of the present invention.

*Example 2—Fig. 1.*—The process is the same as in Example 1 except that 12 grams of sodium hydroxide, instead of 7.7 grams is introduced into the extracting apparatus 1, which gives the filtered solution from filter 3 a pH of 10.4; and sufficient acetic acid is added (as shown by the dotted line arrow) to the clarified extract at 4 to neutralize approximately one-half of the alkali originally added.

A product made by the process of Example 2 had an insoluble protein content of 1.34%, a cloud point of 15.5° C., a stability of 80 days at 25° C. and a stability of 85 days at 50° C.

*Example 3—Fig. 1.*—A zein solution is prepared by extracting gluten meal with 85% isopropyl alcohol for 1½ hours at 60° C., as in the previous examples but without introducing alkali into the extraction vessel.

The resulting solution is adjusted to a protein content of approximately 6 grams of protein per 100 cc. To this extract, before clarification, is added sodium hydroxide (as indicated by the dotted arrow at 2), amounting to 0.2 gram per 100 cc. of the solution. This gives the solution a pH of 11.5. After clarification sufficient hydrochloric acid is added to the mixing vessel 4, as shown by the dotted arrow, to neutralize half of the above stated amount of alkali. Upon precipitation with water, which yielded a water phase having a pH of 6.8, a sample of the zein, obtained in accordance with this example, was analyzed and had an insoluble protein content of 0.87%, a cloud point of 18.5%, a stability of 8 days at 25° C., and a stability of 16 days at 50° C.

*Example 4—Fig. 2.*—The gluten meal is extracted in the extraction vessel 10 by isopropyl alcohol of 60% by volume concentration (55%— 65%) for 1½ hours at 60° C. Similar results can be obtained by using ethyl alcohol at 55%–70% concentration by volume. The extract, having a concentration of 7.14 grams of protein per 100 cc. of the extract, is run into a vessel 11 and is there treated with 1.5 grams of sodium hydroxide per 100 cc. of extract. The mixture which has a pH of 9.0 is aged for 1 hour at room temperature. The material is then cooled to 15° C. at 12, filtered at 13, and water added at 14 to reduce the alcohol content to about 35%, by volume. At this point the zein is separated as a heavy solution, the pH adjusted by addition of acid at 15, (an optional step), and the zein precipitated at 16 by the addition of large volumes of water. The precipitated zein is filtered and dried at 17. The alkaline substance may be introduced at any suitable stage of the process, for example in the extraction stage.

A product obtained from the process in accordance with Example 4 had an insoluble protein content of 2.5%, a cloud point of 14.5° C., a stability at 25° C. of 10 days, and a stability at 50° C. of 1 day. Under the old process where the alkaline substance is not used, a common insoluble protein content is about 15%.

*Example 5— Fig. 2.*—The process is the same as in Example 4 except that the extract is treated with 2.3 grams of potassium hydroxide per liter of extract. This will give the mixture a pH of about 9.9. After ageing for 16 hours at room temperature, the extract is worked up as in Example 4.

A product made in accordance with Example 5 had an insoluble protein content of 1.2%, a cloud point of 17° C., a stability at 25° C. of 31 days, and a stability at 50° C. of 3 days.

*Example 6—Fig. 2.*—The process here is the same as in Examples 4 and 5, except that the extract is treated with calcium hydroxide in the proportion of 3 grams of calcium hydroxide per liter of extract. This gives a mixture having a pH of 11.3. After ageing for 16 hours at room temperature, and recovery of the zein as in Examples 4 and 5, the product had an insoluble protein content of 2.5%, a cloud point of 15.5° C., a stability at 25° C. of 20 days, and a stability of 50° C. of 1 day.

The products of the above described invention, as described in Examples 1 to 3, when subjected to the tests above described, are characterized by high solubility, e. g. 0.5% to 2.5% insoluble substances; low cloud point, e. g. 5° to 20° C.; and high stability, e. g. 40 days to 85 days at 25° C., and 8 days to 85 days at 50° C. The zein treated in accordance with the present invention is somewhat lighter in color than ordinary zein.

The relatively low stability of the products of Examples 4 to 6 is no indication of failure of the process since the extracts obtained with the low concentration alcohols of these examples give zein solutions which are very unstable in comparison with solutions obtained by extraction with high concentration alcohol. In Examples 4 to 6 the improvement in solution stability was very marked.

We claim:

1. Improvement in the process of extracting zein from gluten meal with an alcoholic solvent at an elevated temperature and recovering the zein from the solution which comprises: introducing a small amount of an alkaline substance into the zein containing material subjected to the extraction process in an amount to give the solution a pH of substantially 9 to 11.5; and removing precipitated matter.

2. Improvement in the process of extracting zein from gluten meal with an alcoholic solvent and recovering the zein from the solution which comprises: introducing a small amount of an alkaline substance into the zein undergoing extraction to give the extract a pH of substantially 9 to 11.5; and removing precipitated matter.

3. Improvement in the process of extracting zein from gluten meal with an alcoholic solvent and recovering the zein from the solution which comprises: introducing a small amount of an alkaline substance into the zein extract and filtering the extract to remove precipitated protein bodies.

4. Improvement in the process of extracting zein from gluten meal with an alcoholic solvent and recovering the zein from solution by precipitation with water, which comprises: bringing into contact with the zein extract an amount of alkaline substance to give the extract a pH of approximately 9–11.5; removing from the extract protein bodies rendered insoluble by said alkali treatment; and, before precipitating the zein with water, neutralizing with an acid a part only of the alkaline substance so as to prevent formation of emulsions when the zein is precipitated in water.

5. Improvement in the process of extracting zein from gluten meal with an alcoholic solvent and recovering the zein from the solution by precipitation in water which comprises: introducing a small amount of an alkaline substance into the zein extract; filtering the extract to remove precipitated protein bodies; and treating the zein solution with an acid to neutralize part only of said alkaline substance before the solution is subjected to the precipitating step for the purpose of preventing the formation of emulsions during the precipitating step.

6. Process of obtaining zein from gluten meal which comprises: extracting the zein with an alcoholic solvent containing a small amount of sodium hydroxide to give the extract a pH of substantially 9–11.5; cooling the extract; filtering the extract to remove precipitated protein bodies; introducing an acid into the filtered solution to neutralize about one-half of the alkaline substance; and precipitating the zein from its solution by the addition of large volumes of water.

7. The process of claim 6 in which the sodium hydroxide is introduced into the zein extract before the filtering operation instead of into the extraction step.

8. Process of obtaining zein from gluten meal which comprises: extracting the zein with an alcoholic solvent; adding to the extract a small amount of an alkaline substance and ageing the mixture; filtering the zein solution; adding acid thereto to neutralize a part only of the alkaline substance for the purpose of preventing the formation of emulsions during the precipitating step; and precipitating the zein from the solution by water.

9. Improvement in the process of obtaining zein from gluten meal by extraction with an alcoholic solvent which comprises: adding a small amount of alkaline substance to the extract to precipitate protein matter; ageing the extract at room temperature; and filtering the solution to remove precipitated protein bodies.

10. Improvement in the process of obtaining zein from gluten meal by extraction with an aqueous alcohol of sufficient diluteness so that there is substantially no extraction of oil and color, which comprises: adding to the zein containing material subjected to the process an amount of an alkaline substance to give the extract a pH of approximately 9–11.5 so as to increase the solubility and solution stability of the product without degrading the zein chemically; and removing precipitated protein matter from the extract.

11. Process of improving the solubility and solution stability of zein which comprises: treating a solution of the zein in a solvent not chemically reactive with zein or alkalies at a temperature substantially within the range of 50°–65° C. with an amount of alkali to give the solution a pH substantially within the range 9–11.5 to precipitate protein matter and to solubilize additional protein matter without degrading the zein; and removing the precipitated protein matter.

LLOYD C. SWALLEN.
MARTIN L. HAMILTON.

CERTIFICATE OF CORRECTION.

Patent No. 2,332,356. October 19, 1943.

LLOYD C. SWALLEN, ET AL.

It is hereby certified that error appears in the printed specification of the above numbered patent requiring correction as follows: Page 4, first column, lines 26 and 27, claim 9, for "extract to precipitate protein matter; ageing the extract at" read --extract; ageing the extract to precipitate protein matter at--; and that the said Letters Patent should be read with this correction therein that the same may conform to the record of the case in the Patent Office.

Signed and sealed this 21st day of December, A. D. 1943.

(Seal)

Henry Van Arsdale,
Acting Commissioner of Patents.